(12) United States Patent
DiMascio

(10) Patent No.: US 6,869,517 B2
(45) Date of Patent: Mar. 22, 2005

(54) ELECTROLYTIC PROCESS AND APPARATUS

(75) Inventor: Felice DiMascio, Rocky Hill, CT (US)

(73) Assignee: Halox Technologies, Inc., Bridgeport, CT (US)

(*) Notice: Subject to any disclaimer, the term of this patent is extended or adjusted under 35 U.S.C. 154(b) by 31 days.

(21) Appl. No.: 10/065,472

(22) Filed: Oct. 22, 2002

(65) Prior Publication Data

US 2003/0082095 A1 May 1, 2003

Related U.S. Application Data

(60) Provisional application No. 60/345,307, filed on Oct. 22, 2001, and provisional application No. 60/369,090, filed on Mar. 29, 2002.

(51) Int. Cl.$^7$ .............................. C25B 1/24; C25B 9/00
(52) U.S. Cl. ...................... 205/499; 204/242; 204/252; 204/253
(58) Field of Search ............................... 205/499, 500; 204/242, 252, 253, 283, 284

(56) References Cited

U.S. PATENT DOCUMENTS

| | | | |
|---|---|---|---|
| 2,717,237 A | 9/1955 | Rempel | 204/101 |
| 3,386,915 A | 6/1968 | Rutschi et al. | 210/62 |
| 3,684,437 A | 8/1972 | Callerame | 423/472 |
| 3,763,006 A | 10/1973 | Callerame | 204/103 |
| 3,878,072 A | 4/1975 | Cook, Jr. et al. | 204/95 |
| 3,884,777 A | 5/1975 | Harke et al. | 204/84 |
| 3,904,496 A | 9/1975 | Harke et al. | 204/98 |
| 4,115,217 A | 9/1978 | Larsson et al. | 204/95 |
| 4,234,446 A | 11/1980 | Ramras | 252/187 R |
| 4,250,144 A | 2/1981 | Ratigan | 422/112 |
| 4,308,117 A | 12/1981 | Sweeney | 204/101 |
| 4,362,707 A | 12/1982 | Hardee et al. | 423/478 |
| 4,369,103 A * | 1/1983 | White | 204/252 |
| 4,381,290 A | 4/1983 | Hardee et al. | 423/478 |
| 4,426,263 A | 1/1984 | Hardee et al. | 204/101 |
| 4,432,856 A | 2/1984 | Murakami et al. | 204/237 |
| 4,542,008 A | 9/1985 | Capuano et al. | 423/477 |
| 4,632,876 A | 12/1986 | Laird et al. | 428/404 |
| 4,683,039 A | 7/1987 | Twardowski et al. | 204/95 |
| 4,725,390 A | 2/1988 | Laird et al. | 264/62 |
| 4,767,510 A | 8/1988 | Lipsztajn | 204/101 |
| 4,806,215 A | 2/1989 | Twardowski | 204/98 |
| 4,853,096 A | 8/1989 | Lipsztajn et al. | 204/101 |
| 5,008,096 A | 4/1991 | Ringo | 423/477 |
| 5,041,196 A | 8/1991 | Cawlfield et al. | 204/101 |
| 5,077,258 A | 12/1991 | Phillips et al. | 502/321 |
| 5,078,908 A | 1/1992 | Ripley et al. | 252/187.21 |
| 5,084,149 A | 1/1992 | Kaczur et al. | 204/101 |
| 5,092,970 A | 3/1992 | Kaczur et al. | 204/98 |
| 5,106,465 A | 4/1992 | Kaczur et al. | 204/98 |
| 5,158,658 A | 10/1992 | Cawlfield et al. | 204/252 |
| 5,242,552 A | 9/1993 | Coin et al. | 204/95 |
| 5,242,553 A | 9/1993 | Kaczur et al. | 204/95 |
| 5,248,397 A * | 9/1993 | Cawlfield et al. | 205/556 |
| 5,264,089 A | 11/1993 | Kaczur et al. | 204/95 |
| 5,296,108 A | 3/1994 | Kaczur et al. | 204/95 |

(List continued on next page.)

OTHER PUBLICATIONS

International Search Report; International Application No. PCT/US02/33911; International Filing Date Oct. 22, 2002; Date of Mailing Feb. 4, 2004; (5 pages).

*Primary Examiner*—Donald R. Valentine
(74) *Attorney, Agent, or Firm*—Cantor Colburn LLP

(57) ABSTRACT

An electrolytic process and apparatus for oxidizing inorganic or organic species is disclosed. The process and apparatus includes contacting a solution containing the inorganic or organic species with an electrocatalytic material disposed in an electrolytic reactor. Also disclosed are processes for fabricating a catalyst material for use in the electrolytic reactors and processes.

71 Claims, 8 Drawing Sheets

U.S. PATENT DOCUMENTS

| | | | |
|---|---|---|---|
| 5,348,659 A | 9/1994 | Kunz et al. | 210/678 |
| 5,354,435 A | 10/1994 | Kaczur et al. | 204/95 |
| 5,391,533 A | 2/1995 | Peterson et al. | 502/262 |
| 5,419,816 A | 5/1995 | Sampson et al. | 204/59 R |
| 5,435,984 A | 7/1995 | Daly et al. | 423/477 |
| 5,523,072 A * | 6/1996 | Falgèn et al. | 204/520 X |
| 5,609,742 A | 3/1997 | Sampson et al. | 204/536 |
| 5,705,050 A | 1/1998 | Sampson et al. | 205/687 |
| 5,858,191 A | 1/1999 | DiMascio et al. | 204/524 |
| 5,858,246 A | 1/1999 | Rafter et al. | 210/754 |
| 5,868,915 A | 2/1999 | Ganzi et al. | 204/524 |
| 6,024,850 A | 2/2000 | Sampson et al. | 204/296 |
| 6,171,485 B1 | 1/2001 | Kuke | 210/192 |
| 6,203,688 B1 | 3/2001 | Lipsztajn et al. | 205/556 |
| 6,265,343 B1 | 7/2001 | Daly et al. | 502/339 |
| 6,294,108 B1 | 9/2001 | Speronello et al. | 252/187.21 |
| 2001/0005499 A1 | 6/2001 | Ostgard | 423/477 |

* cited by examiner

ELECTROLYTIC PROCESS AND APPARATUS

CROSS REFERENCE TO RELATED APPLICATIONS

This application claims priority to U.S. Provisional Application Ser. No. 60/345,307, filed on Oct. 22, 2001, and U.S. Provisional Application Ser. No. 60/369,090, filed on Mar. 29, 2002, which are incorporated herein by reference in their entireties.

BACKGROUND OF INVENTION

This disclosure relates to electrolysis and more particularly, relates to improved electrolytic processes and apparatuses for the oxidation of inorganic or organic species.

With the decline of gaseous chlorine as a microbiocide, various alternatives have been explored, including bleach, bleach with bromide, bromo-chlorodimethyl hydantoin, ozone, and chlorine dioxide ($ClO_2$). Of these, chlorine dioxide has generated a great deal of interest for control of microbiological growth in a number of different industries, including the dairy industry, the beverage industry, the pulp and paper industries, the fruit and vegetable processing industries, various canning plants, the poultry industry, the beef processing industry and miscellaneous other food processing applications. Chlorine dioxide is also seeing increased use in municipal potable water treatment facilities and in industrial waste treatment facilities, because of its selectivity towards specific environmentally-objectionable waste materials, including phenols, sulfides, cyanides, thiosulfates, and mercaptans. In addition, chlorine dioxide is being used in the oil and gas industry for downhole applications as a well stimulation enhancement additive.

Unlike chlorine, chlorine dioxide remains a gas when dissolved in aqueous solutions and does not ionize to form weak acids. This property is at least partly responsible for the biocidal effectiveness of chlorine dioxide over a wide pH range, and makes it a logical choice for systems that operate at alkaline pH or that have poor pH control. Moreover, chlorine dioxide is a highly effective microbiocide at concentrations as low as 0.1 parts per million (ppm) over a wide pH range.

The biocidal activity of chlorine dioxide is believed to be due to its ability to penetrate bacterial cell walls and react with essential amino acids within the cell cytoplasm to disrupt cell metabolism. This mechanism is more efficient than other oxidizers that "burn" on contact and is highly effective against legionella, algae and amoebae cysts, giardia cysts, coliforms, salmonella, shigella, and cryptosporidium.

Unfortunately, chlorine dioxide in solution is unstable with an extremely short shelf life and thus, is not commercially available. Chlorine dioxide must typically be generated at its point of use such as, for example, by a reaction between a metal chlorate or metal chlorite in aqueous solution and a strong acid.

Electrochemical processes provide a means for generating chlorine dioxide for point of use applications. For example, U.S. Pat. No. 5,419,816 to Sampson et al. describes a packed bed ion exchange electrolytic system and process for oxidizing species in dilute aqueous solutions by passing the species through an electrolytic reactor packed with a monobed of modified cation exchange material. A similar electrolytic process is described in U.S. Pat. No. 5,609,742 to Sampson et al. for reducing species using a monobed of modified anion exchange.

One difficulty with electrochemical processes is that it can be difficult to control the generation of undesirable species. For example, there are many electrochemical reactions that can occur at the anode. Within a potential range of 0.90 to 2.10 volts, at least eight different reactions are thermodynamically possible, producing products such as chlorate ($ClO_2^-$), perchlorate ($ClO_4^{31}$ ), chlorous acid ($HClO_2$), oxygen ($O_2$), hydrogen peroxide ($H_2O_2$) and ozone ($O_3$). It is highly desirable and a significant commercial advantage to achieve high yield efficiency without producing these undesirable side reactions.

Chlorine dioxide has also been produced from a chlorine dioxide precursor solution by contacting the precursor solution with a catalyst (e.g., catalysts containing a metal such as described for example in U.S. Pat. No. 5,008,096) in the absence of an electrical field or electrochemical cell. However, known catalytic processes have the disadvantage of becoming greatly deactivated within a matter of days. Moreover, it has been found that the support materials for the catalytic sites tend to quickly degrade due to the oxidizing nature of chlorine dioxide. Still further, the use of catalyst materials in packed columns or beds for generating chlorine dioxide has been found to cause a significant pressure drop across the column or form channels within the column that results in a significant decrease in conversion efficiency from the chlorine dioxide precursor to chlorine dioxide.

SUMMARY OF INVENTION

An electrolytic reactor for the electrocatalytic oxidation of chlorite ions in an aqueous solution comprises an anode; a cathode; and a particulate catalyst material.

In another embodiment, an electrolytic reactor for the oxidation of chlorite ions in an aqueous solution comprises an anode compartment comprising an anode and a catalyst material; and a cathode compartment comprising a cathode.

In another embodiment, an electrolytic reactor for the oxidation of chlorite ions in an aqueous solution comprises an anode compartment comprising an anode; a cathode compartment comprising a cathode; and a central compartment disposed between the anode and cathode compartments, wherein the central compartment comprises a catalyst material.

In another embodiment, an electrolytic reactor for the oxidation of chlorite ions in an aqueous solution comprises an anode compartment comprising an anode; a cathode compartment comprising a cathode; and a central compartment disposed between the anode and cathode compartments, wherein the central compartment comprises a catalyst material, and wherein a non-permselective membrane separates the anode compartment from the central compartment.

A process for fabricating a ceramic catalyst material comprises dissolving a metal oxide precursor into a solution; adding an additive consisting of anions or cations to the solution; coating a ceramic particle with the solution; and heating the coated ceramic particle to a temperature effective to form a metal oxide.

A process for generating chlorine dioxide from an alkali metal chlorite solution comprises applying a current to the electrolytic reactor, wherein the electrolytic reactor includes an anode, a cathode, and a catalyst material, flowing an aqueous alkali metal chlorite solution into the electrolytic reactor; and contacting the alkali metal chlorite solution with the catalyst material to electrocatalytically produce an effluent containing chlorine dioxide.

In another embodiment, a process for generating chlorine dioxide from an alkali metal chlorite solution includes applying a current to an electrolytic reactor including an anode compartment comprising an anode and a catalyst material; and a cathode compartment comprising a cathode; flowing an aqueous alkali metal chlorite solution into the electrolytic reactor; and contacting the alkali metal chlorite solution with the catalyst material to electrocatalytically produce an effluent containing chlorine dioxide.

In another embodiment, a process for generating chlorine dioxide from an alkali metal chlorite solution comprises applying a current to an electrolytic wherein the electrolytic reactor includes an anode compartment comprising an anode, a cathode compartment comprising a cathode, and a central compartment disposed between the anode and cathode compartments, wherein the central compartment comprises a catalyst material, flowing water into the anode compartment and generating hydrogen atoms; passing the hydrogen atoms into the central compartment; flowing the alkali metal chlorite solution into the central compartment, and contacting the alkali metal chlorite solution with the catalyst material to produce an effluent containing chlorine dioxide.

In another embodiment, a process for generating chlorine dioxide from a dilute alkali metal chlorite solution comprises applying a current to an electrolytic reactor, wherein the electrolytic reactor comprises an anode compartment comprising an anode, a cathode compartment comprising a cathode, and a central compartment disposed between the anode and cathode compartments, wherein the central compartment comprises a catalyst material, and wherein a non-permselective membrane separates the anode compartment from the central compartment; flowing water into the anode compartment and generating hydrogen atoms; passing the hydrogen atoms into the central compartment; flowing the dilute alkali metal chlorite solution into the central compartment; and contacting the dilute alkali metal chlorite solution with the catalyst material to produce an effluent containing chlorine dioxide.

The above described and other features will become better understood from the detailed description that is described in conjunction with the accompanying drawings.

BRIEF DESCRIPTION OF DRAWINGS

Referring now to the figures wherein the like elements are numbered alike.

DETAILED DESCRIPTION

Figure 1:
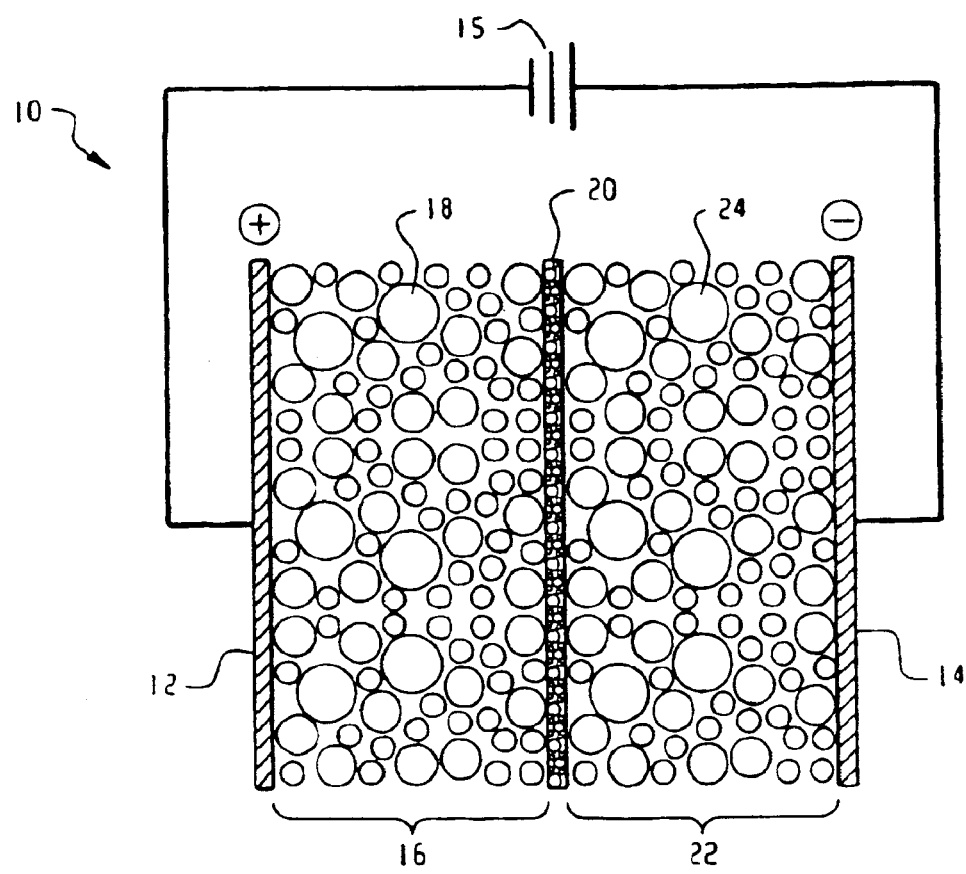
FIG. 1 shows a cross sectional view illustrating a packed bed electrolytic reactor.

Referring now to FIG. 1, wherein like elements are numbered alike, there is shown a cross-sectional view illustrating an electrolytic reactor 10. The electrolytic reactor 10 includes an anode 12 and a cathode 14 in electrical communication with a source of direct current 15 (DC). Interposed between the anode 12 and the cathode 14 exists at least one compartment 16 of particulate material 18. As used herein, the term "particulate material" refers to a cation exchange material and/or a catalyst material. The particulate material 18 in compartment 16 includes the catalyst material or a mixture of the catalyst material and the cation exchange material.

Figure 2:
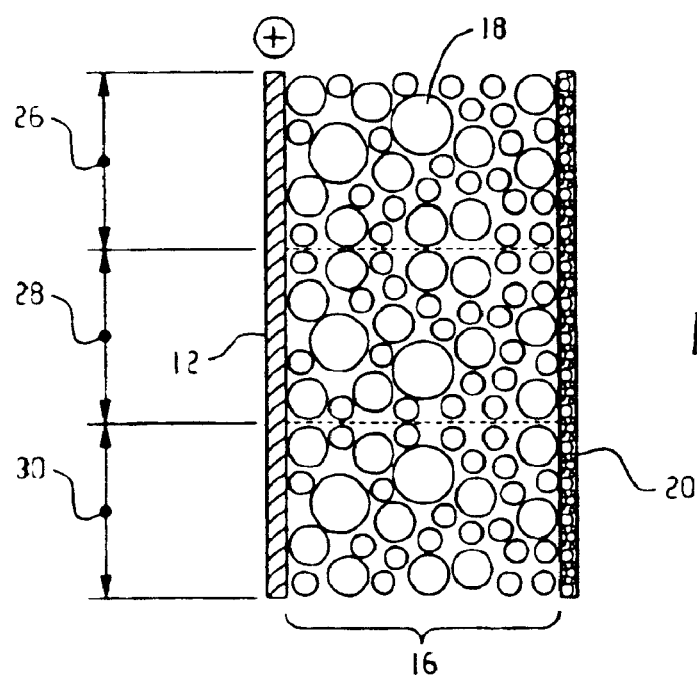
FIG. 2 shows a partial cross sectional view illustrating the anode compartment of FIG. 1, wherein the particulate material is layered.

In a preferred embodiment, the particulate material 18 is layered within compartment 16. The term "layer" refers to discrete portions within compartment 16, each layer possessing its own physical properties and through which the aqueous feed solution passes sequentially. The number of layers can vary. Preferably, the total number of layers is about 1 to about 12, with about 2 to about 6 more preferred and with about 3 to about 4 most preferred. For example, as shown in FIG. 2, the particulate material 18 may be layered in the anode compartment 16 in layers 26, 28, and 30. Although layers, 26, 28, and 30 are shown as having relatively similar dimensions, different dimensions for each layer are contemplated and may be preferable depending on the particular application. Preferably, the bottommost layer 30 is filled with the cation exchange material, the middle-most layer 28 is about an equal mixture of the catalyst material and the cation exchange material, and the uppermost layer 26 is filled with the catalyst material. In this configuration, it is preferred that the solution flow upwardly through the particulate material 18 from the bottommost layers 30 to the uppermost layers 26.

It is optional whether or not the electrolytic reactor 10 includes a cathode compartment 22. In the event the cathode compartment 22 is present, a membrane 20 preferably separates the anode compartment 16 from the cathode compartment 22. As used herein, the term "membrane" refers to a sheet for separating the particulate matter from passing from one compartment to the other. In this regard, the term "membrane" can be used interchangeably with screen, diaphragm, partition, barrier, a sheet, a foam, a sponge-like structure, a canvas, and the like. The membrane can be chosen to be permselective, e.g., a cation exchange membrane or can be chosen to be non-permselective, e.g., a porous membrane. As used herein, the term "permselective" refers to a selective permeation of commonly charged ionic species through the membrane with respect to other diffusing or migrating ionic species having a different charge in a mixture. In contrast, the term "non-permselective" generally refers to a porous structure that does not discriminate among differently charged ionic species as the species pass through the porous structure, i.e., the membrane is non-selective with respect to ionic species. For example, in a permselective membrane such as a cation exchange membrane, cations can freely pass through the membrane whereas the passage of anions is prevented. In contrast, in a non-permselective membrane such as a porous membrane, the passage of anions and cations through the porous membrane are controlled by diffusion.

The cathode compartment 22 may or may not contain particulate material. If the cathode compartment 22 contains particulate material, as 24 shown in FIG. 1, the cathode compartment 22 may be configured to possess its own physical properties (i.e., different properties from the particulate material 18 disposed in compartment 16) through which an aqueous solution can pass without entering adjacent compartment 16. Preferably, the particulate material 24 in the cathode compartment 22 comprises a cation exchange material.

An additive or additives, such as electrically conductive particles, may also be interspersed with the particulate materials 18, 24, to achieve certain results.

Figure 3:
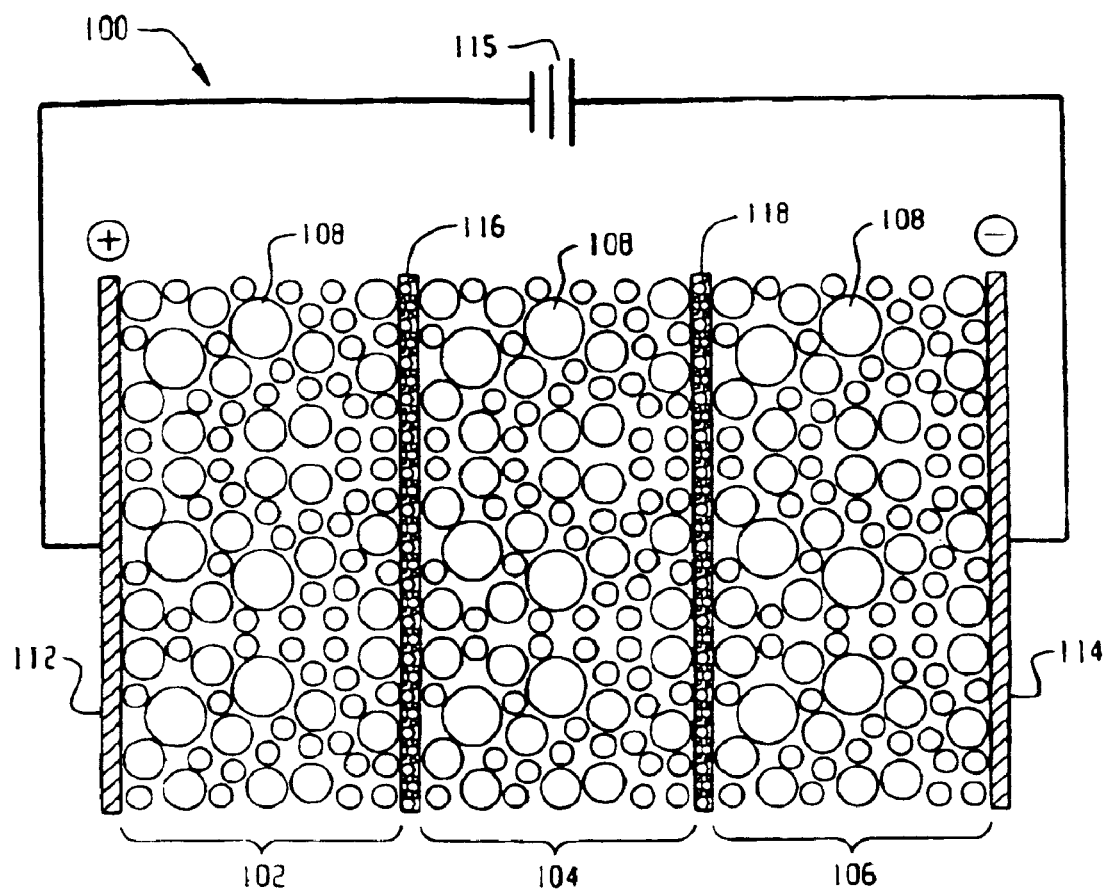
FIG. 3 shows a cross sectional view illustrating another packed bed electrolytic reactor.

Referring now to FIG. 3, there is shown a cross-sectional view illustrating an electrolytic reactor 100 including an anode compartment 102, a central compartment 104 and a cathode compartment 106. As shown, the central compartment 104 is interposed between the anode and cathode compartments 102, 106, respectively, and is separated from compartments 102, 106 by membranes 116, 118. As previously described, the membranes employed in the reactor may be a permselective membrane, a non-permselective membrane, or a combination of permselective and non-permselective membranes. In one embodiment, the membrane 116 separating the anode compartment 102 from the central compartment 104 is selected to be non-permselective. In yet another embodiment, the membranes 116, 118 separating the central compartment 104 from the adjacent anode and cathode compartments 102, 106, respectively, are selected to be non-permselective membranes.

The anode compartment 102 includes an anode 112 and preferably, is filled with particulate material 108. The cathode compartment 106 includes a cathode 114 and preferably, is filled with particulate material 108. The anode 112 and the cathode 114 are in electrical communication with a source of direct current 115 (DC). The central compartment 104 is filled with particulate material 108.

In one embodiment, the central compartment 104 is filled with the catalyst material or a mixture of the catalyst material and the cation exchange material.

In another embodiment, the anode and cathode compartments 102, 106 are filled with the cation exchange material and the central compartment 104 is filled with the catalyst material or a mixture of the catalyst material and the cation exchange material.

In another embodiment, each compartment 102, 104, and 106 includes the catalyst material or a mixture of the catalyst material and the cation exchange material.

Figure 4:
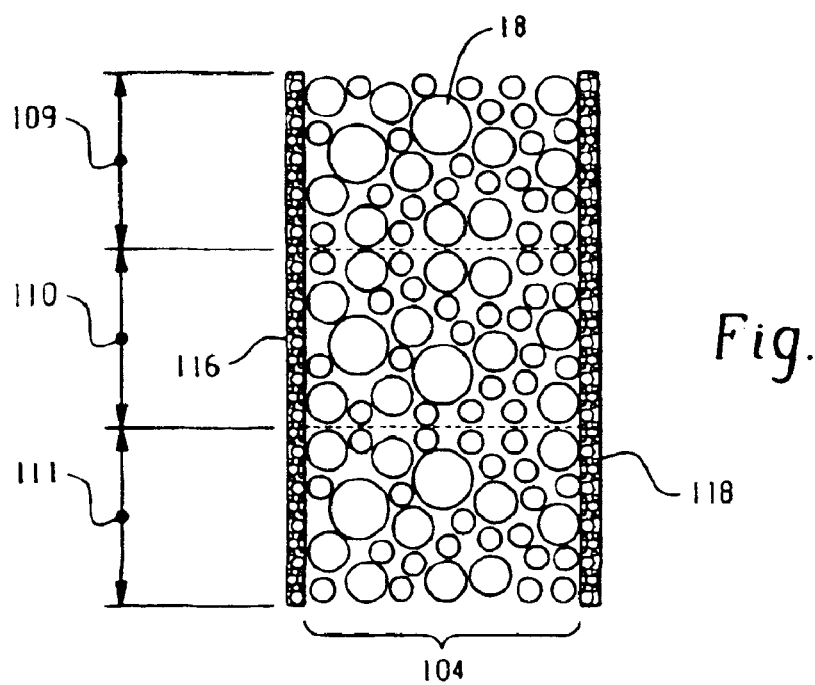
FIG. 4 shows a partial cross sectional view illustrating the central compartment of FIG. 3, wherein the particulate material is layered.

In a preferred embodiment, the particulate material 108 in the central compartment 104 is arranged in layers. As previously discussed, the number of layers can vary. Preferably, the total number of layers is about 1 to about 12, with about 2 to about 6 more preferred, and about 3 to about 4 even more preferred. For example, as shown in FIG. 4, the particulate material 108 may be layered in the central compartment 104 in three equal layers 109, 110, and 111. Preferably, the bottommost layer 111 is filled with cation exchange material, the middlemost layer 110 is filled with about an equal mixture of catalyst material and cation exchange material, and the uppermost layer 109 is filled with catalyst material. In this configuration, it is preferred that the solution flow upwardly through the particulate material from the bottommost layer 111 to the uppermost layer 109.

Figure 5A:
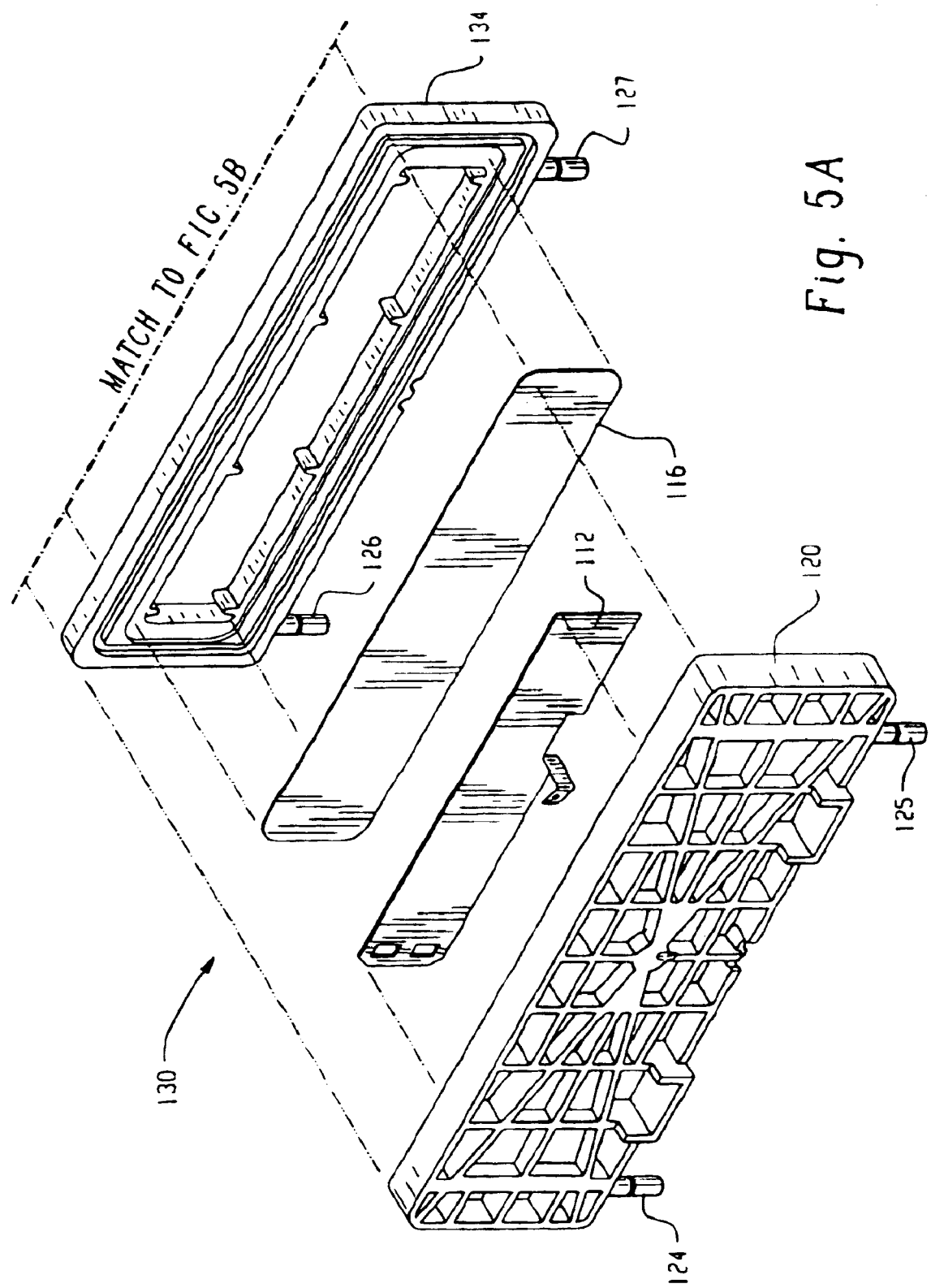
FIGS. 5A and 5B show an exploded isometric view of an electrolytic reactor cassette.
Figure 5B:
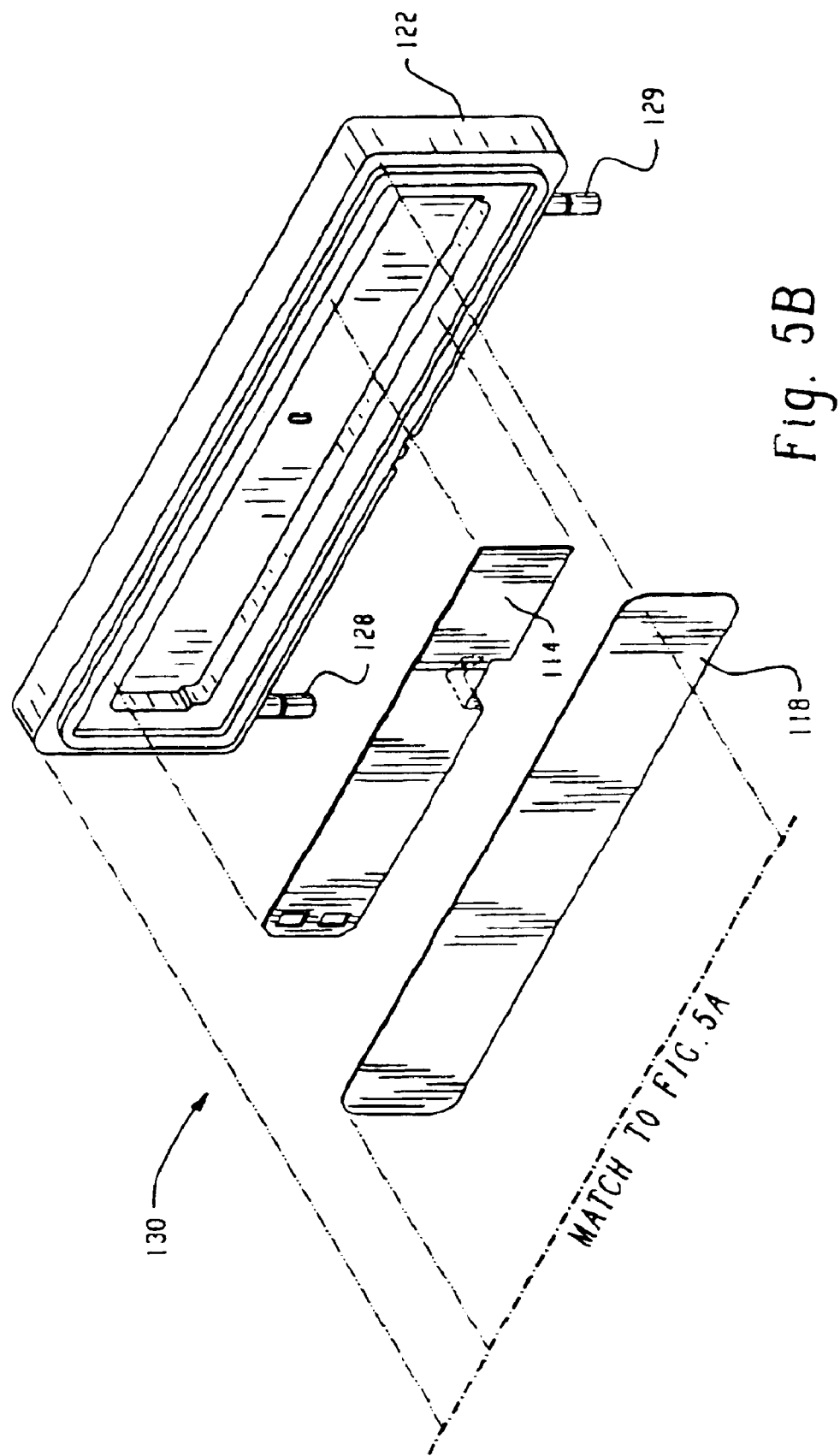

Referring now to FIGS. 5A and 5B, there is shown an exploded isometric view of an exemplary electrolytic reactor cassette 130 employing the three compartments 102, 104, 106, shown in FIG. 2. The cassette is formed from stock materials that are preferably chemically inert and non-conductive. Components forming the cassette may be molded for high volume production or alternatively, may be machined as described in further detail below.

The exemplary cassette 130 is configured for producing about 5 grams per hour of chlorine dioxide and is fabricated from two pieces of flat stock 120 and 122, about 4 inches across by about 14 inches long by about 1 inch thick. The pieces 120, 122 are machined such that depressions ¼ inch deep by 2 inches across by 12 inches long are cut in the center of each piece. The pieces 120, 122 are then drilled and tapped to accept the anode 112 and cathode 114. Each piece further includes fittings 124, 125, 128 and 129, through which fluid would flow. The anode 112 and cathode 114 are approximately 2 inches across by 9 inches long and are inserted into the stock pieces 120 and 122. Membranes 116, 118 (permselective and/or non-permselective depending on the desired application) are disposed over each depression formed in stock pieces 120, 122. Approximately 150 ml of particulate material (not shown) may be packed into each depression to form the anode compartment 102 and the cathode compartment 106, respectively (as shown in FIG. 2). As constructed, the particulate material, if present, is configured to be in direct contact with the anode 112 or cathode 114.

Interposed between the membranes 116, 118 is a piece of flat stock 134, about 4 inches across by about 14 inches long by 1 inch thick. The stock piece 134 is machined such that a hole about 2 inches across by 12 inches long is cut through the piece to form the central compartment 104 (as shown in FIG. 2). The piece 134 is then drilled and tapped to accept two fittings 126 and 127 through which fluid would flow. The central compartment 134 is filled with about 150 ml of particulate material that includes the catalyst material. The components of the electrolytic reactor cassette 130 are assembled and bolted together, or otherwise secured. In this configuration, the species to be oxidized are preferably passed through the central compartment 104 and are not in direct contact with the anode 112 or cathode 114.

In a preferred embodiment, the cassette 130 is formed from an acrylonitrile-butadiene-styrene (ABS) terpolymer. Other suitable materials include polyvinylchloride (PVC), chlorinated PVC, polyvinylidene difluoride, polytetrafluoroethylene and other fluoropolymer materials.

While the arrangements of anode, cathode, and packed bed electrolytic reactors illustrated in FIGS. 1, 2, and 3 are presently considered preferable, any arrangement in which a sufficient quantity of particulate material (including catalyst material) is packed between the anode and cathode in an electrolytic reactor or in at least one of the compartments of a divided electrolytic reactor can be used. Other embodiments include, but are not limited to, separation of the anode and cathode compartments to control intermixing of gases and solutions and provision of any number of packed-bed compartments separated by membranes placed between the anode and cathode to affect other oxidation, reduction or displacement reactions.

The anodes 12, 112 and the cathodes 14, 114 may be made of any suitable material based primarily on the intended use of the electrolytic reactor, costs and chemical stability. For example, the anode may be made of a conductive material, such as ruthenium, iridium, titanium, platinum, vanadium, tungsten, tantalum, oxides of at least one of the foregoing, combinations including at least one of the foregoing, and the like. Preferably, the anode comprises a metal oxide catalyst material disposed on a suitable support. The supports are typically in the form of a sheet, screen, or the like and are formed from a rigid material such as titanium, niobium, and the like. The cathode may be made from stainless steel, steel or may be made from the same material as the anode.

Permselective membranes, e.g., 20, 116, 118, preferably contain acidic groups so that ions with a positive charge can be attracted and selectively passed through the membrane in preference to anions. Preferably, the permselective membrane contains strongly acidic groups, such as R—$SO_{3\_}$ and is resistant to oxidation and temperature effects. In a preferred embodiment, the permselective membranes are fluoropolymers that are substantially chemically inert to chlorine dioxide and the materials or environment used to produce the chlorine dioxide. Examples of suitable permselective membranes include perfluorosulfonate cation exchange membranes commercially available under the trade name NAFION commercially available from E.I. duPont de Nemours, Wilmington, Del.

Non-permselective membranes e.g., 20, 116, 118, contain pores that permit the non-selective diffusion of ionic species as well as non-ionic species from one compartment to the other so long as the species can physically pass through the pores. The non-permselective membrane is preferably selected such that the size of the pores is smaller than the particle size of the particulate material disposed in the compartments. Preferably, the pore size is greater than or equal to about 0.25 millimeters (mm), with greater than or equal to about 0.3 mm even more preferred, and with greater than or equal to about 0.4 mm most preferred. Also preferred, is a pore size less than or equal to about 2.8 mm, with less than or equal to about 1.4 mm more preferred, and with less than or equal to about 0.6 mm most preferred. While not wanting to be bound by theory, it is believed that the pore size contributes to the hygroscopic properties of the membrane and minimizes free movement of a liquid through the membrane by convectionby convection, wherein the membrane becomes more hygroscopic as the pore size decreases.

Preferably, the non-permselective membrane comprises a polymer that is chemically inert to conditions in the electrolytic reactor and has the capability of allowing ionic and non-ionic species to diffuse thererthroughthere through. Preferred polymers include polyolefins and halogenated polymers because of their resistance to hydrolysis and oxidation. Preferred polyolefins include high-density polyethylene, polypropylene, and ethylene-propylene copolymers. Preferred halogenated polymers include fluorinated poly (vinyl) polymers such as, for example, polytetrafluoroethylene, fluorinated ethylene propylene copolymers, perfluoropropylalkoxy copolymers, perfluormethylalkoxy copolymers, polychlorotrifluoroethylene copolymers, ethylene tetrafluoroethylene polymers, polyvinylidene fluoride polymers, and the like. Preferred chlorinated polymers include polyvinylchloride, chlorinated polyvinyl chloride and the like.

As previously noted, the term "particulate material" (e.g., 18, 24, 108) refers to the cation exchange material and/or the catalyst support material./ The cation exchange material is preferably an oxidizing exchanger, i.e., a cation exchange resin. During operation of the electrolytic reactor 10, 100, 130, it is hypothesized that the function of the cation exchange material includes, among others, electro-actively exchanging or adsorbing alkali metal ions from an aqueous alkali metal chlorite solution and releasing hydrogen ions. The released hydrogen ions can then be used to regenerate the cation exchange material back to the hydrogen form thereby releasing alkali metal ions or the like that may then pass into the cathode compartment, if present. The use of the cation exchange material is especially useful when feeding a dilute alkali metal chlorite solution into compartment 16 or 104, as it helps lower the voltage within the compartment and increases conversion efficiency. The term "dilute" refers to aqueous alkali metal chlorite solutions containing less than about 10,000 milligrams alkali metal chlorite per liter of solution (mg/L), preferably less than about mg/L, and more preferably less than about 1,500 mg/L.

Examples of suitable cation exchange materials include, but are not intended to be limited to, polystyrene divinylbenzene cross-linked cation exchangers (e.g., strong acid types, weak acid types, iminodiacetic acid types, chelating selective cation exchangers and the like); strong acid perfluorosulfonated cation exchangers; naturally occurring cation exchangers, such as manganese greensand; high surface area macro-reticular or microporous type ion exchange resins having sufficient ion conductivity, and the like. For example, strong acid type exchange materials suitable for use are commercially available from Mitsubishi Chemical under the trade names Diaion SK116 and Diaion SK104. Optionally, the cation exchange material may be further modified, wherein a portion of the ionic sites are converted to semiconductor junctions, such as described in U.S. Pat. Nos. 6,024,850, 5,419,816, 5,705,050 and 5,609,742, herein incorporated by reference in their entireties. In a preferred embodiment, the cation exchange materials have a cross-linking density greater than about 8%, with greater than about 12% more preferred and with greater than about 16% even more preferred. Increasing the cross-linking density of the cation exchange materials has been found to increase the resistance of the cation exchange materials to oxidation and degradation. As a result, operating lifetimes for the electrolytic reactor can advantageously be extended during use for the production of strongly oxidizing products such as chlorine dioxide.

The particulate cation exchange material may also include electrically conductive particles, such as carbon and the like. The electrically conductive particles can be used to affect the transfer of DC current from the electrode to the membrane. For example, the use of electrically conductive particles can be used to lower the electrical resistance within the compartment. However, some additives, such as carbon, are prone to disintegration in acidic environments, thus requiring careful selection.

The packing density and conductivity of the cation exchange material within the compartment can be adjusted depending on the operating parameters and desired performance for the electrolytic reactors 110, 100, 130. For example, the cation exchange material may be shrunk before use in the electrolytic reactor, such as by dehydration or electrolyte adsorption. Dehydration may be by any method in which moisture is removed from the ion exchange material, for example, using a drying oven. It has been found that dehydration prior to packing can increase the packing density by as much as 40%. Electrolyte adsorption involves soaking the material in a salt solution, such as sodium chloride. The packing density of the material so treated can be increased by as much as 20%. The increase in packing density advantageously increases the volume in which the DC current travels, thus reducing the electrical resistance in the electrolytic reactor.

The catalyst material preferably comprises a support and an active metal catalyst. Preferably, the active metal catalyst is finely and discretely deposited onto the support. While not wanting to be bound by theory, it is believed that the active metal catalyst adsorbs hydrogen atoms without reacting with the hydrogen atoms, which form stable hydrides. Preferably, the active metal catalyst does not adsorb hydrogen atoms into its crystal lattice since this will decrease its catalytic activity. In a preferred embodiment, the active metal catalyst is a noble metal and does not react or dissolve with any of the components or solutions used in the electrolytic reactor 10, 100. While not wanting to be bound by theory, it is believed that the catalytic activity of the active metal is associated with crystal imperfections and the finely divided deposits help to increase the surface area as well as increase the number of active catalytic sites. Suitable active metal catalysts include, but are not limited to, ruthenium, platinum, palladium, osmium, iridium, rhodium, titanium, manganese, lead, zirconium, niobium, tantalum, tungsten, tin, and composites or mixtures or alloys or oxides of at least one of the foregoing metal catalysts. Preferably, the active metal catalyst is an oxide of a metal selected from the group consisting of ruthenium, platinum, palladium, osmium, iridium, and rhodium. More preferably, the active metal catalyst is a platinum oxide.

In another embodiment, the active metal catalyst is a combination of an oxide of ruthenium, platinum, palladium, osmium, iridium, rhodium or mixtures or alloys of at least one of the foregoing and a less active oxide of a metal including titanium, lead, manganese, zirconium, niobium, tantalum, tungsten, tin or mixtures or alloys of at least one of the foregoing. Preferably, the molar ratio of the active metal catalyst to the less active metal catalyst is of about 0.3:1 to about 100:1. More preferably, the molar ratio of the active metal catalyst to the less active metal catalyst is about 10:1.

Preparation of the catalyst material generally includes contacting the support with a catalyst precursor to form the active metal catalyst sites, for example, a catalyst precursor salt. In one embodiment, a metal oxide precursor salt is dissolved in an aqueous solution including an alcohol, and the solution is coated onto the support. Suitable alcohols include methanol, ethanol, isopropanol, propanol, butanol, combinations including at least one of the foregoing alcohols, and the like. In a preferred embodiment, the metal oxide precursor salt is dissolved in isopropanol and deionized water solution. The amount of alcohol used in the solution is dependent on the solubility of the metal oxide precursor salt, wherein the volume fraction of alcohol in an aqueous solution is about 30 to about 90% (v/v), with about 40 to about 80% (v/v) preferred and with about 50 to about 60% (v/v) more preferred.

Depending on the desired properties, a solution of the metal oxide precursor salt may contain further additives, for example, ions that increase the solubility of the metal oxide precursor. Suitable ions include hydroxides, chlorides, phosphates, sulfates, ammonium, potassium, sodium, lithium or the like. Preferably, the additive is ammonium hydroxide. The weight fraction of additive in the solution is about 0.1 to about 10% (w/v), with about 0.5 to about 5% (w/v) preferred and with about 1% (w/v) more preferred.

Alternatively, the metal catalyst may be deposited onto the support material using other techniques such as impregnation, co-precipitation, ion exchange, dipping, spray coating, vacuum deposition, sputtering or the like. Preferably, the amount of metal catalyst deposited onto the support is about 0.01 to about 100-weight %, with about 0.01 to about 10-weight % more preferred, and with about 0.05 to about 2-weight % most preferred. In addition, it has been found that the catalyst activity of the catalyst material is improved with multiple depositions, i.e., the metal oxide precursor solution is applied by several individual depositions. Preferably, the number of depositions is about 2 to about 12, with the number of depositions of about 2 to about 3 more preferred.

The metal deposited onto the support by the precursor solution is then thermally or chemically oxidized to the oxide form. When utilizing a thermal process, adjusting the temperature can control the extent of oxidation. The support is preferably thermally stable to the oxidation temperatures employed. The oxidation temperatures are preferably about 200° C. to about 1000° C., with about 400° C. to about 800° C. more preferred, and with about 500° C. to about 700° C. even more preferred. Suitable chemical oxidants include permanganate. The extent of oxidation may be increased when a multiple deposition process is used in contrast to a single deposition process.

Suitable supports for the catalyst material include metals, zeolites, anthracite, glauconite, faujasite, mordenite, clinoptilolite, aluminas, silicas, clays, ceramics, carbon and the like. Of these supports, ceramics are most preferred. In a preferred embodiment, the catalyst materials are made from those ceramics described in U.S. Pat. Nos. 4,725,390 and 4,632,876, herein incorporated by reference in their entireties. Preferred ceramics are those made essentially from nonmetallic minerals (such as mineral clays) by firing at an elevated temperature. More preferred are ceramic materials commercially available under the trade name MACROLITE® by the Kinetico Company. The MACROLITE® ceramic materials are spherically shaped and characterized by having a rough texture, high surface area, and level of moisture absorption of less than about 0.5%. The low level of moisture absorption allows for the metal oxide precursor solution to penetrate a minimal depth into the surface of the ceramic, thereby depositing metal onto the external surface of the support, an optimum location for subsequent contact with an aqueous solution. The surface area of the MACROLITE® ceramic materials is believed to be on the order of about 103 m$^2$ per gram.

The process for making ceramic support materials, such as the MACROLITE® material, generally includes the following steps. In the first step, mineral particulate, binder, silicon carbide, and parting agent are mixed and spheroidized in order to form unfired spheroids. One example of mineral particulates contains: 60% orthoclase, 10% nepheline, 10% hornblende, 5% diopside, 15% accessory minerals (titanite, apatite, magnetite and biotite) and trace amounts of secondary minerals (e.g. kaolinite and analcite). Another example contains approximately 75% plagioclase and orthoclase feldspar and 25% of the minerals pyroxene, hornblende, magnetite and quartz of which magnetite is less than 5%. Byproduct mineral fines of perlite (containing 2–5% chemically bound water) will also function as the mineral particulates. Minerals containing chemically bound water or sulfur, which are useful components of the mineral particulates, are hornblende, apatite, biotite, pyrite, vermiculite and perlite.

Binders that may be useful as raw materials include bentonite starch, polyvinyl alcohol, cellulose gum, polyvinyl acetate and sodium lignosulphonate. The amount of binder may generally comprise about 1 to about 5% by weight of the dry materials fed to the mixer and is generally sufficient to permit screening and handling of the spheroids without significant attrition or breakage.

Suitable parting agents include magnesium oxide, zircon, diaspore and high alumina clays as well as other surface metal oxides.

The spheroids are then dried at a temperature of about 40° C. to about 200° C. and typically screened. The ceramic spheroids are then over-fired in a kiln, which allows for the formation of the internal air cells, making the finished product less dense. The firing atmosphere is typically air. The silicon carbide in the spheroids is oxidized during firing, the SiC near the surface being more extensively oxidized than that in the core.

The product from the kiln is screened using standard methods known to those skilled in the art. Either before, during or after the screening step, the fired spheroids may be subjected to vigorous agitation by air or some other agitation means or to a water washing step in order to remove dust from their surfaces. The support material is then coated with an active metal catalyst in the manner previously described.

The particulate material, i.e., the cation exchange material or the catalyst material, is not intended to be limited to any particular shape. Suitable shapes include rods, extrudates, tablets, pills, irregular shaped particles, spheres, spheroids, capsules, discs, pellets or the like. In a preferred embodiment, the particulate material is spherical. More preferably, the particulate material includes a reticulated and textured surface having an increased surface area. The size of the particulate material is dependent on the acceptable pressure drop across the bed of particulate material. The smaller the particulate material, the greater the pressure drop.

The size of the particulate material is generally defined by a mesh size of a sieve in which the particles are screened. For example, a 30 mesh sieve will allow particles less than about 600 micrometers to pass through the sieve, whereas particles about 600 micrometers or larger than will not pass through. Generally, sieves of varying mesh ratings are stacked and particles are separated using methods well known to those skilled in the art. The range of particles separated is defined by the mesh size of the sieves used. For example, a mesh size designation of 20/40 means that substantially all particles have a size ranging from, 20 to 40 mesh (about 841 to about 420 micrometers in diameter). A 30/50 designation indicates that substantially all particles have a size ranging from 30 to 50 mesh (about 595 to about 297 micrometers in diameter). The sizes of the particulate matter are preferably smaller than 7 mesh (about 2800 micrometers in diameter), with smaller than 14 mesh (about 1400 micrometers in diameter) more preferred, and with smaller than 30 mesh (about 595 micrometers in diameter) even more preferred. Also preferred are particulate sizes greater than 60 mesh (about 250 micrometers in diameter), with greater than 50 mesh (about 297 micrometers in diameter) more preferred, and greater than 40 mesh (about 425 micrometers) even more preferred.

In a preferred mode of operation, a dilute aqueous feed solution of an alkali metal chlorite solution is passed through a selected compartment of the electrolytic reactor to generate an effluent containing chlorine dioxide. For example, in electrolytic reactor 100, the alkali metal chlorite solution preferably flows through central compartment 104. Water flows through the cathode and anode compartments 102, 106, respectively. Preferably, the water is deionized. As a current is applied to the reactor 100, the anode compartment 102 oxidizes the water to generate, among others, hydrogen ions whereas the cathode compartment 106 reduces the water to generate, among others, hydroxyl ions. The hydrogen ions generated in the anode compartment 102 can diffuse through membrane 116 into the central compartment 104. The hydrogen ions can be used to regenerate the cation exchange resin, if present, within the central compartment 104. Oxidation of the dissociated hydrogen ions into hydrogen atoms transpires so that the electrochemical oxidation of chlorite ions to chlorine dioxide can occur. The applied current to the reactor 100 should be sufficient to reduce the pH of the resulting chlorine dioxide effluent solution to less than about 7. More preferably, the pH is reduced to about 1 to about 5, with a reduction of pH to about 2 to about 3 most preferred. The alkali metal ions from the alkali metal chlorite solution cansolution can diffuse through membrane 118 to the cathode compartment 106 and with the hydroxyl ions produce an alkali metal hydroxide effluent from the cathode compartment 106.

In electrolytic reactor 10, the alkali metal chlorite solution flows through the anode compartment 16. As a current is applied to the reactor 10, the anode compartment 16 oxidizes the solution to generate, among others, hydrogen ions. As previously described, oxidation of the dissociated hydrogen ions into hydrogen atoms transpires so that the electrochemical oxidation of chlorite ions to chlorine dioxide can then occur.

The concentration of chlorine dioxide produced by the electrolytic reactor, e.g. 10, 100, is preferably less than about 6.0 grams per liter (g/L), with less than about 3 g/L more preferred and less than about 0.65 g/L even more preferred. Also preferred is a chlorine dioxide concentration greater than about 0.06 g/L, with greater than about 0.3 g/L more preferred and greater than about 0.5 g/L even more preferred. At concentrations greater than about 6.0 g/L, there is an increased risk of producing chlorine dioxide in the vapor phase, which undesirably can cause an explosion referred to by those skilled in the art as a "puff".

There are a number of variables that may be optimized during operation of the electrolytic reactor. For example, current density is preferably maintained at about 5 to about 100 milliAmps per square centimeter ($mA/cm^2$). More preferably, the current density is less than about 50 $mA/cm^2$, with less than about 35 $mA/cm^2$ even more preferred. Also preferred, are current densities greater than about 10 $mA/cm^2$, with greater than about 25 $mA/cm^2$ more preferred. The temperature at which the aqueous medium is maintained during contact of the alkali metal chlorite solution with the catalyst can vary widely. Preferably, the temperature is less than about 50° C., with less than about 35° C. more preferred and with less than about 25° C. even more preferred. Also preferred is a temperature greater than about 2° C., with greater than about 5° C. more preferred, and with greater than about 10° C. even more preferred. In a preferred embodiment, the process is carried out at ambient temperature.

In addition to temperature and current density, the contact time of the chlorine dioxide precursor with the catalyst material is preferably less than about 20 minutes and more preferably, less than about 2 minutes. Also preferred is a contact time greater than about 1 minute, with greater than about 0.1 minute more preferred. The velocity of the chlorine dioxide precursor solution through the catalyst bed is preferably less than about 100 centimeters/minute (cm/min), with less than about 70 cm/min more preferred and less than about 30 cm/min more preferred. Also preferred is a velocity greater than about 0.1 cm/min, with greater than about 10 cm/min more preferred and with greater than about 20 cm/min even more preferred. The pressure drop through the catalyst bed is preferably less than about 20 pounds per square inch (psi) and for most applications, with less than about 10 psi more preferred. Also preferred is a pressure drop greater than about 0.1 psi, and for most applications, with greater than about 1 psi more preferred. Further optimization for any of these process variables is well within the skill of those in the art in view of this disclosure.

While not wanting to be bound by theory, the use of the catalyst material in the electrochemical reactor system effectively lowers the activation energy for the oxidation of dissociated hydrogen ions into hydrogen atoms. Oxidation of the dissociated hydrogen ions into hydrogen atoms transpires so that the electrochemical oxidation of chlorite ions to chlorine dioxide can occur. It is believed that the electrochemical production of chlorine dioxide from chlorite ions is believed to proceed in accordance with the following reaction scheme:

$$5ClO_2^- + 4H^+ \rightarrow 4ClO^2 + Cl^- + 2H_2O \quad (I)$$

Based on this reaction scheme, the maximum yield efficiency of chlorine dioxide will be an 80% conversion. Moreover, in addition to generating chlorine dioxide, the reaction advantageously produces as a byproduct, chloride ions. Chloride ions are not toxic or hazardous for most applications requiring the in situ generation of chlorine dioxide.

In electrolytic reactors employing a non-permselective membrane to separate the anode compartment from the central compartment, the use of dilute chlorite solutions as described herein and the hygroscopic nature of the non-permselective membrane minimizes diffusion of the chlorite ions from the central compartment to the electrode compartments. Moreover, it is believed that employing cation exchange resins in the anode and/or cathode compartments further minimizes diffusion of chlorite ions from the central compartment to the respective electrode compartment. As a result, conversion efficiency of chlorite ion to chlorine dioxide is close to or about the maximum conversion efficiency.

EXAMPLE 1

In this example, a ceramic catalyst material was prepared as follows. A metal oxide precursor solution was prepared by admixing 0.85 grams tetraamineplatinum (II) chloride, 41 ml of 91% isopropyl alcohol, 0.83 ml of 30% ammonium hydroxide and 26 ml of deionized water. The precursor solution was used twice to coat 100 milliliters of MACRO-LITE ML-20/40 that had been backwashed and air dried for about 12 hours. After each coating, the resin was baked at 550° C. for 30 minutes.

EXAMPLE 2

In this example, a ceramic catalyst material was prepared as follows. A metal oxide precursor solution was prepared by admixing 0.85 grams tetraamineplatinum (II) chloride. 41 ml of 91% isopropyl alcohol, 0.83 ml of 30% ammonium hydroxide and 26 ml of deionized water. The precursor solution was used twice to coat 100 milliliters of SIR-600 resin commercially available from ResinTech, Inc. that had been backwashed and air-dried for about 12 hours. After each coating, the resin was baked at 550° C. for 30 minutes.

EXAMPLE 3

In this example, electrochemical reactor cassettes were configured as described in FIGS. 4 and 5. The electrode compartments contained SK116 cation exchange resin commercially available from Mitsubishi Chemical. The central compartment contained a particulate material bed of three equal layers. The first layer consisted of SK116 cation exchange resin; the second layer consisted of equal amounts by weight of the SK116 cation exchange resin and the catalyst material; and the third layer consisted of the catalyst material. The catalyst material was prepared in accordance with Examples 1. An overview of the cassette components is shown in Table I.

TABLE I

| Anode | DSA, flat sheet |
|---|---|
| Cathode | 316L stainless steel, flat sheet |
| Electrode Area | 155 cm² |
| Membrane Area | 155 cm² |
| Inter Membrane Spacing | 1.27 cm |
| Catalyst | Pt impregnated (Example 1) |
| Cation Exchange Resin | SK116 (Mitsubishi Chemical) |
| Cation Exchange Membrane | CM1-7000 (Membranes International, Inc.) |

Four cassettes containing the ceramic catalyst material were installed in parallel in a HALOX 1000 chlorine dioxide generator. Performance for the electrolytic reactor system was monitored for 1000 hours, wherein each data point was taken at 100-hour intervals. A continuous stream of softened water having a conductivity of 120 $\mu$S/cm was passed through each compartment at a rate of 150 mL/minute and a temperature of 25° C. Sodium chlorite at a concentration of 25% (wt/wt) was injected into the stream flowing into the central compartment at a flow rate such that the concentration of sodium chlorite was approximately 1000 mg/L (the maximum chlorine dioxide yield based on the chlorite concentration is 746 mg/L). The temperature of the sodium chlorite solution was maintained at about 25° C. and was first passed through the first layer of the central compartment. A constant current of about 4.0 amps was applied to each cassette.

Figure 6:
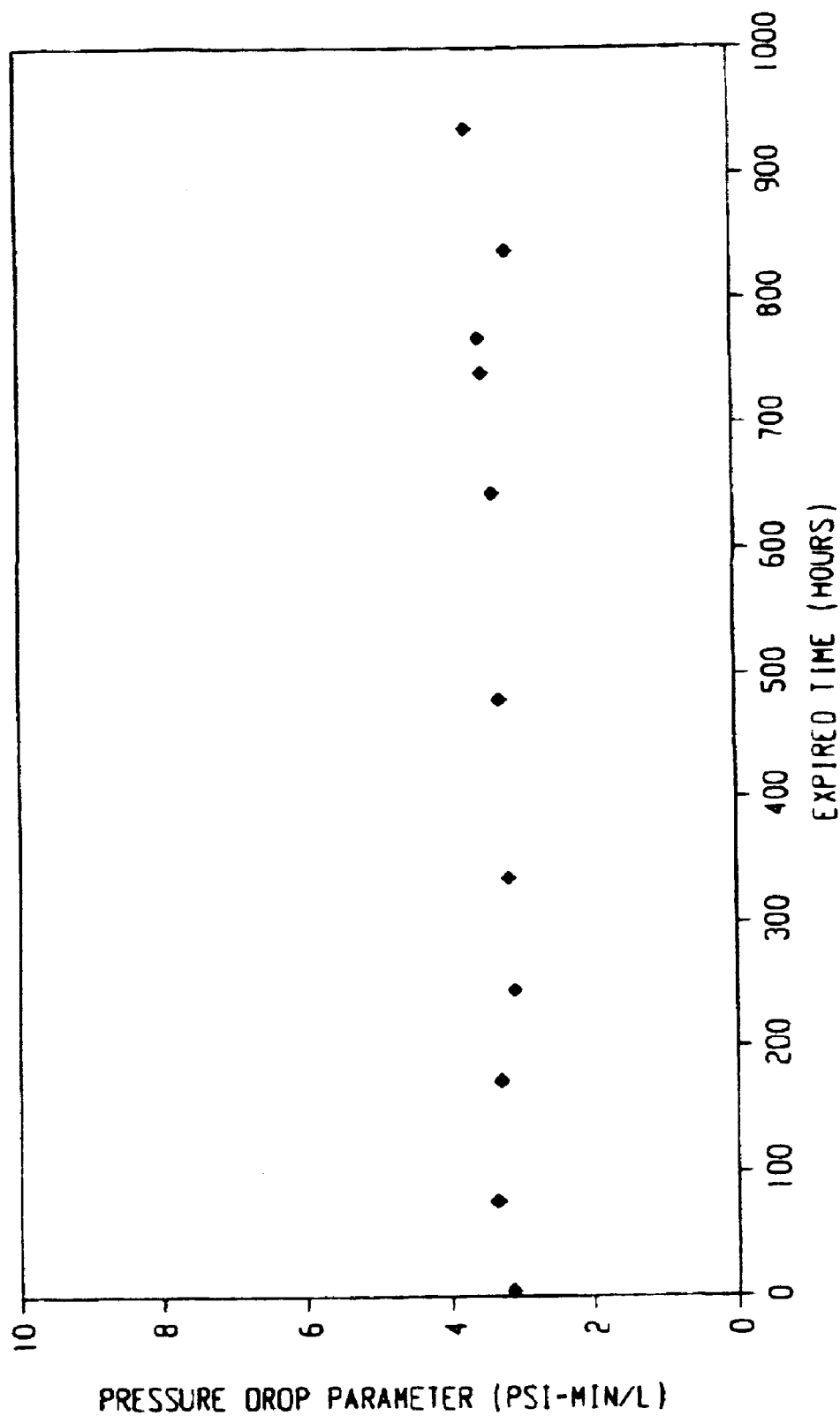
FIG. 6 is a graph showing a pressure drop of an electrolytic reactor as a function of time for different catalyst support materials.

FIG. 6 illustrates the pressure drop (pressure/flow rate) through the central compartment as a function of time. An increase in pressure drop is an indication that compaction of the bed within the central compartment is occurring. The use of the electrolytic reactor employing the catalyst material did not result in a pressure increase during continuous operation of the reactor for 1000 hours. Rather, the results show that the pressure drop was constant throughout the period of operation suggesting that compaction of the bed did not occur. A visual inspection of a disassembled cassette showed no evidence of compaction or channeling.

Figure 7:
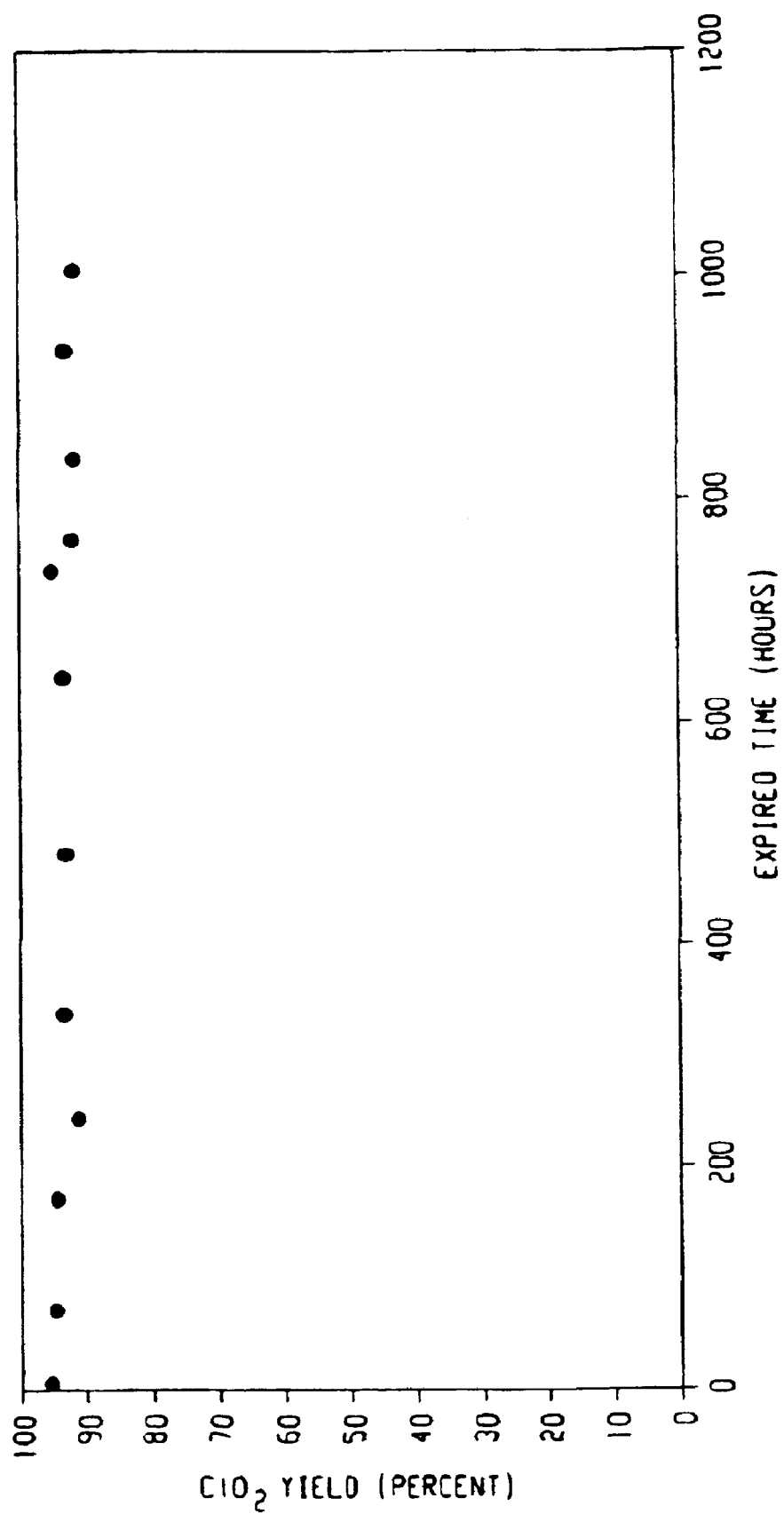
FIG. 7 is a graph showing conversion efficiency of an electrolytic reactor as a function of time during the electrolytic production of chlorine dioxide from an aqueous sodium chlorite feed solution.

FIG. 7 graphically depicts the conversion efficiency as a function of time. A Direct Reading Spectrophotometer, Model No. DR/2000, was used to measure the chlorine dioxide concentration (mg/L) in the exiting solution using Hach Company Method 8138. Measurement of the yield provides a standard for evaluating actual performance of the cassette and can be determined in accordance with the following mathematical relationship:

$$\%Yield = \frac{actual}{theoretical} \times 100$$

wherein the actual yield is determined from the amount of chlorine dioxide generated, and wherein the theoretical yield is calculated by the amount of chlorine dioxide that could be generated from the sodium chlorite solution. As previously discussed, since it takes five moles of chlorite ions to make 4 moles of chlorine dioxide, the theroeticlatheoretical yield can be calculated as follows:

$$\%TheoreticalYield = \frac{[ClO_2]_{produce}}{\left[\frac{4}{5}\right][NaClO_2]_{few}\left[\frac{90.5}{67.5}\right]} \times 100$$

wherein the term (90.5/67.5) is the ratio of the equivalent weight of the sodium chlorite to chlorine dioxide.

As shown in FIG. 7, the conversion efficiency for the cassette employing the ceramic material is constant at about greater than about 95% of the maximum theoretical yield during the 1000 hours of continuous operation. Thus, the use of the catalyst material in the electrolytic reactor provides a yield that is at about the maximum possible yield. Increased conversion efficiencies over a prolonged period of time are a significant commercial advantage since it reduces the maintenance and operating costs of these reactors significantly.

EXAMPLE 4

In this example, two electrochemical reactor cassettes were configured as described in FIGS. 4 and 5. Each cassette included electrode compartments that contained SK116 cation exchange resin, wherein each compartment was separated from an adjacent compartment by cation exchange membranes (permselective). The central compartment of the first cassette contained a particulate material bed of three equal layers. The first layer consisted of SK116 cation exchange resin; the second layer consisted of equal amounts by weight of the SK116 cation exchange resin and a ceramic catalyst material; and the third layer consisted of the ceramic catalyst material. The ceramic catalyst material was prepared in accordance with Example 1. The central compartment of the second cassette contained a packed bed of Diaion SK1B cation exchange resin. Commercially available from Mitsubishi Chemical, Diaion SK1B is a cross-linked polystyrene cation exchange resin having a cross-linking density of 8%.

Softened water was passed upwardly through the anode compartment at a flow rate of about 150 mL/min. A 25-weight % of sodium chlorite solution was added to the effluent of the anode compartment such that the final concentration of sodium chlorite was about 1000 mg/L. The combined sodium chlorite/effluent solution was then passed through the catalyst compartment. In the compartment including the three layers, the fluid passed from the bottom-most layer to the topmost layer. In addition, softened water was passed upwardly through the cathode compartment at a flow rate of about 50 mL/min. While passing the solutions through the compartments of the reactor, a controlled current of about 4.0 amps was applied to the anode and cathode.

The results are summarized in Table II. All data recorded was taken after operating the electrolytic reactor for about 3 hours. The measured parameters for each cassette included cassette voltage, current, pressure drop through the bed flow rate (mL/min), ClO$_2$ concentration (ppm), temperature (° C.) and pH.

[t1]

TABLE II

|  | Catalyst Material | Cation Exchange Resin |
|---|---|---|
| ClO$_2$ concentration, (ppm) | 558 | 11 |
| Flow Rate, (mL/min) | 150 | 158 |
| Temperature, (° C.) | 26.5 | 26.5 |

TABLE II-continued

|  | Catalyst Material | Cation Exchange Resin |
|---|---|---|
| pH | 2.76 | 2.45 |
| Pressure Drop, (psi) | 8.0 | 13.0 |
| Voltage, (volts) | 23.0 | 19.2 |
| Current, (Amps) | 4.03 | 4.12 |

Clearly, the use of the ceramic catalyst material resulted in significantly superior results compared to the use of cation exchange resin in the central compartment. After only 3 hours of operation, conversion of chlorite ions to chlorine dioxide concentration was 50 times greater with the cassette employing the catalyst bed compared to the cassette employing the cation exchange resin bed. Moreover, the pressure drop across the bed increased significantly with the cassette employing the cation exchange resin indicating compaction of the bed.

EXAMPLE 5

In this example, electrochemical reactor cassettes were configured as described in FIGS. 4 and 5. The cathode compartment was separated from the central compartment with a cation exchange membrane. The central compartment contained a particulate material bed of three equal layers. The first layer consisted of SK116 cation exchange resin; the second layer consisted of equal amounts by weight of the SK116 cation exchange resin and a catalyst material; and the third layer consisted of the catalyst material. The catalyst material was prepared in accordance with Example 2, i.e., modified SIR-600 resin. The electrode compartments contained SK106 cation exchange resin.

In one set of cassettes, the anode compartment was separated from the central compartment using a Flourtex® 9-70/22 non-permselective membrane commercially available from Sefar America, Inc. The Fluortex® is a fluorocarbon based membrane, and in this example, had a pore size of 0.070 millimeters. In a second set of cassettes, the anode compartment was separated from the central compartment using a cation exchange membrane.

The electrochemical reactor cassettes were operated in the following manner. Softened water having a conductivity of about 120 μS/cm was passed upwardly through the anode compartment at a flow rate of about 150 mL/min. A 25-weight % sodium chlorite solution was added to the effluent of the anode compartment such that the final concentration of sodium chlorite was about 1000 mg/L. The combined sodium chlorite/effluent solution was then passed through the central compartment at a temperature of about 25° C. In addition, softened water was passed upwardly through the cathode compartment at a flow rate of about 50 mL/min. While passing the solutions through the various compartments of the reactor, a controlled current of about 4.0 amps was applied to the anode and cathode.

Figure 8:
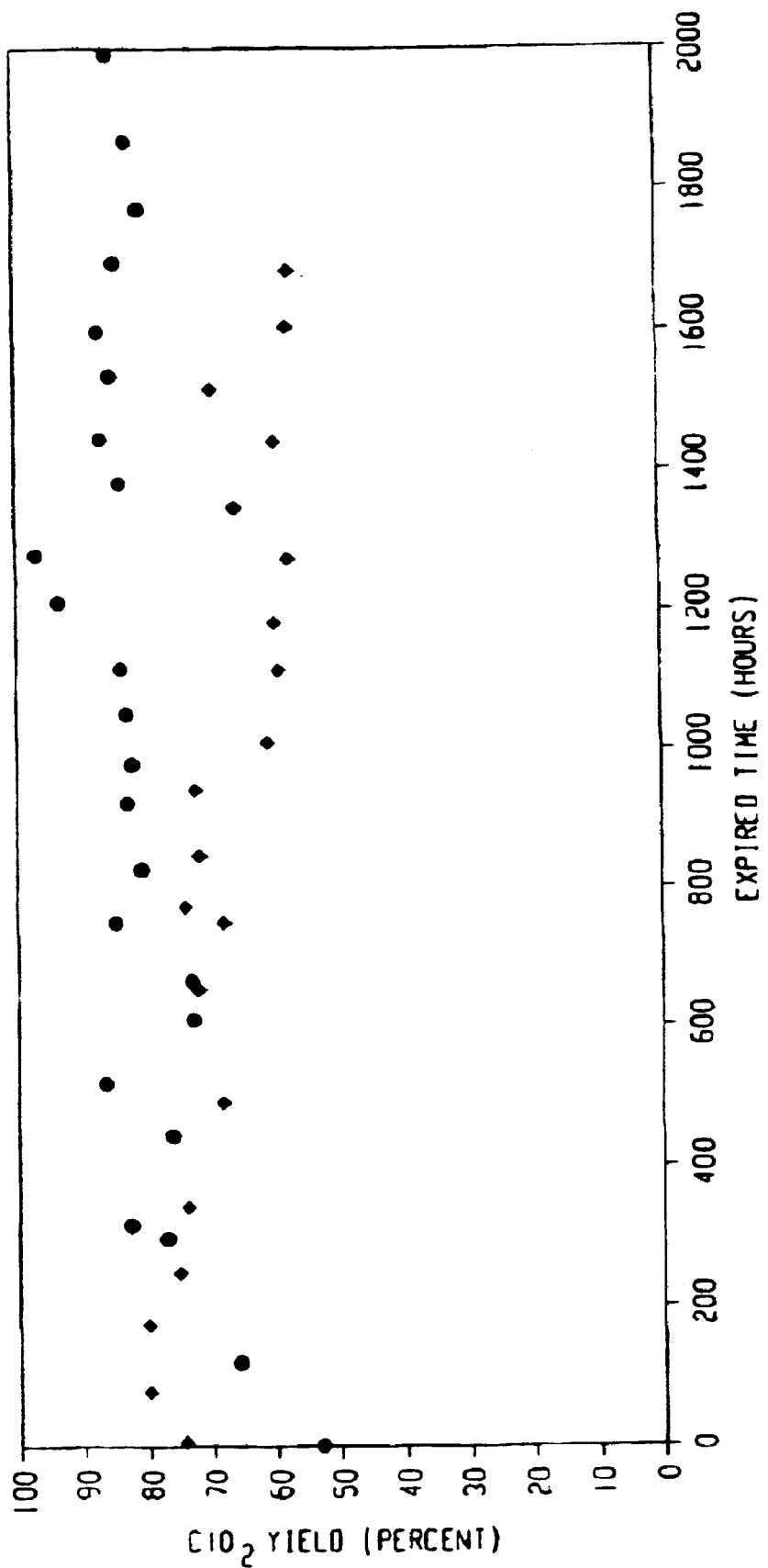
FIG. 8 is a graph showing a comparison of conversion efficiencies for different electrolytic reactors.

FIG. 8 graphically illustrates the percent conversion of the chlorite ions to chlorine dioxide as a function of time for each set of cassettes. After an initial break-in period of about 200 hours of operation, the conversion efficiency for the cassettes that included the non-permselective membrane is greater than about 80–90% during the period of time monitored. Thus, the use of the non-perrmselective membrane between the anode compartment and the central compartment in the electrolytic reactor provided a yield that is at about the maximum possible yield. In contrast, the use of cassettes that included a cation exchange membrane (permselective) between the anode compartment and the central compartment exhibited a gradual decrease in conversion efficiency from about 1000 hours to about 2000 hours. Visual examination of the cation exchange membrane after about 2000 hours of operation indicated that oxidation had occurred. The cation exchange membrane exhibited discoloration, cracking, and delamination. In contrast, examination of the non-permselective membrane showed no visual evidence of oxidation.

Comparing the conversion efficiencies obtained in FIG. 8 with the conversion efficiencies presented in FIG. 7 illustrates the increased efficiency resulting from the use of the catalyst material prepared in accordance with Example 1 (ceramic media) as compared to the catalyst material in accordance with Example 2 (ion exchange resin).

Figure 9:
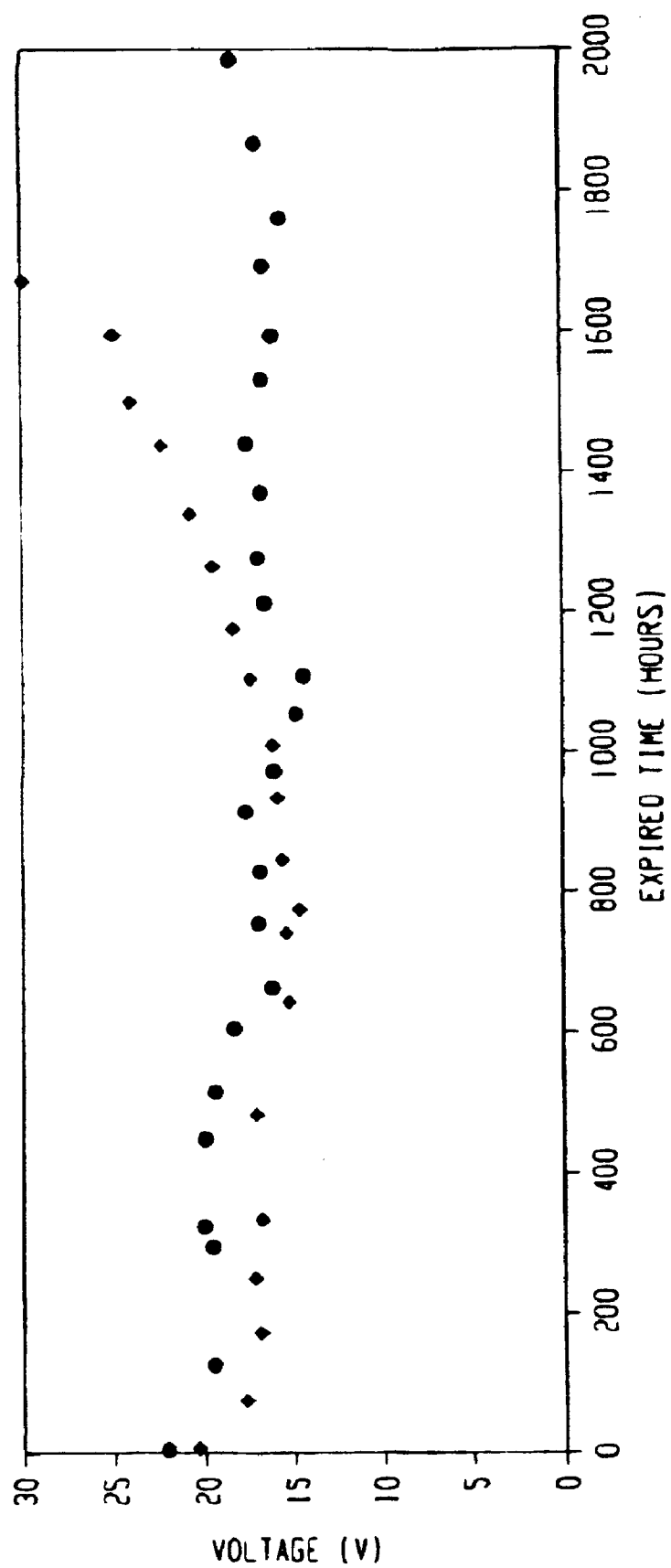
FIG. 9 is a graph showing a comparison of the applied voltage level as a function of time for different electrolytic reactors.

FIG. 9 graphically illustrates the applied voltage to the cassette as a function of time. The voltage was adjusted during operation of the electrolytic reactor to maintain a controlled current of about 4.0 amps. In the set of cassettes employing the non-permselective membrane, voltage was relatively constant throughout the 2000 hours of operation. In contrast, the voltage was gradually increased in the cassettes employing the cation exchange membrane (permselective). Since heterogeneous membranes such as the cation exchange membrane consist of colloidal ion exchange particles embedded in an inert binder, the gradual increase in voltage is believed to be caused by the oxidation of the ionthe ion exchange particles, which causes the material to swell within the rigid matrix, thereby decreasing the size of the interstices within the membrane and corresponding access to the ionic sites contained therein. This, in turn, is believed to create a greater resistance to migrating and diffusing ionic species, resulting in an increased voltage over the operating lifetime to maintain a constant current.

While the disclosure has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this diclosure, but that the disclosure will include all embodiments falling within the scope of the appended claims.

What is claimed is:

1. An electrolytic reactor for the electrocatalytic oxidation of chlorite ions in an aqueous solution, the reactor comprising:
    an anode;
    a cathode; and
    a particilate catlyst material, wherein the catalyst material comprises a catalytic metal oxide and a ceramic support.

2. The electrolytic reactor according to claim 1, wherein the support comprises a mineral particulate, a binder, silicon carbide, and a parting agent.

3. The electrolytic reactor according to claim 1, wherein the catalytic metal oxide is about 0.01 to about 10% by weight of the support.

4. The electrolytic reactor according to claim 1, wherein the catalytic metal oxide is about 0.05 to about 2% by weight of the support.

5. The electrolytic reactor according to claim 1, further comprising a cation exchange material.

6. The electrolytic reactor according to claim 5, wherein the cation exchange material forms a bottom layer, a mixture of the cation exchange material and the catalyst material forms an interlayer, and the catalyst material forms an upper layer.

7. An electrolytic reactor for the oxidation of chlorite ions in an aqueous solution, the reactor comprising:
    an anode compartment comprising an anode and a catalyst material, wherein the catalyst material comprises a catalytic metal oxide and a ceramic support; and
    a cathode compartment comprising a cathode.

8. The electrolytic reactor according to claim 7, wherein the support comprises a mineral particulate, a binder, silicon carbide, and a parting agent.

9. The electrolytic reactor according to claim 7, wherein the catalytic metal oxide is about 0.01 to about 100% by weight of the support.

10. The electrolytic reactor according to claim 7, wherein the catalytic metal oxide is about 0.05 to about 2% by weight of the support.

11. The electrolytic reactor according to claim 7, further comprising a cation exchange material.

12. The electrolytic reactor according to claim 11, wherein the cation exchange material forms a bottom layer, a mixture of the cation exchange material and the catalyst material forms an interlayer, and the catalyst material forms an upper layer.

13. An electrolytic reactor for the oxidation of chlorite ions in an aqueous solution, the reactor comprising:
    an anode compartment comprising an anode;
    a cathode compartment comprising a cathode; and
    a central compartment disposed between the anode and cathode compartments, wherein the central compartment comprises a catalyst material.

14. The electrolytic reactor according claim 13, wherein the anode compartment consists essentially of a cation exchange material.

15. The electrolytic reactor according to claim 14, wherein the cation exchange material is selected from the group consisting of strong acid polystyrene divinylbenzene crosslinked resins, weak acid polystyrene divinylbenzene crosslinked resins, iminoacetic acid polystyrene divinylbenzene crosslinked chelating selective cation exchange resins, synthetic inorganic cation exchangers and naturally occurring cationic exchangers.

16. The electrolytic reactor according claim 13, wherein the cathode compartment consists essentially of a cation exchange material.

17. The electrolytic reactor according to claim 13, wherein the catalyst material comprises a catalytic metal oxide and a support.

18. The electrolytic reactor according to claim 17, wherein the catalytic metal oxide is about 0.01 to about 10% by weight of the support.

19. The electrolytic reactor according to claim 17, wherein the catalytic metal oxide is about 0.05 to about 2% by weight of the support.

20. The electrolytic reactor according to claim 17, wherein the support is selected from the group consisting of metals, zeolites, anthracite, clinoptiliolite, aluminas, silicas, ceramics and carbon.

21. The electrolytic reactor according to claim 17, wherein the support comprises a ceramic.

22. The electrolytic reactor according to claim 17, wherein the support comprises a mineral particulate, a binder, silicon carbide, and a parting agent.

23. The electrolytic reactor according to claim 17, wherein the catalytic metal oxide is an oxide of a metal selected from the group consisting of ruthenium, platinum, palladium, osmium, iridium, rhodium, titanium, manganese, lead, zirconium, niobium, tantalum, tungsten, tin and combinations of at least one of the foregoing.

24. The electrolytic reactor according to claim 17, wherein the support comprises a material selected the group consisting of orthoclase, nepheline, hornblende, diopside, titanite, apatite, magnetite, biotite, kaolinite, analcite, plagioclase, orthoclase, feldspar, pyroxene, quartz, perlite, apatite, biotite, pyrite, bentonite, starch, polyvinyl alcohol, vermiculite cellulose gum, polyvinyl acetate, lignosulphonate and combinations comprising at least one or more of the foregoing.

25. The electrolytic reactor according to claim 13, wherein the catalyst material comprises a size of about 425 microns to about 600 microns.

26. The electrolytic reactor according to claim 13, wherein the catalyst material comprises a size of about 1,400 microns to about 300 microns.

27. The electrolytic reactor according to claim 13, wherein the catalyst material comprises a size of about 2,800 microns to about 250 microns.

28. The electrolytic reactor according to claim 13, wherein the central compartment further comprises a cation exchange material, wherein the cation exchange material and the catalyst material are arranged in layers, wherein each one of the layers has a different physical property.

29. The electrolytic reactor according to claim 28, wherein the central compartment comprises a bottom layer consisting essentially of the cation exchange material, an interlayer consisting essentially of a mixture of the cation exchange material and the catalyst material, and an upper layer consisting essentially of the catalyst material.

30. The electrolytic reactor according to claim 28, wherein the cation exchange material has a crosslinking density greater than or equal to about 16%.

31. The electrolytic reactor according to claim 13, wherein the central compartment is separated from the anode compartment with a non-permselective membrane.

32. A process for generating chlorine dioxide in an alkali metal chlorite solution, the process comprising:
applying a current to an electrolytic reactor, wherein the electrolytic reactor includes an anode, a cathode, and a catalyst material;
flowing an aqueous alkali metal chlorite solution into the electrolytic reactor; and
contacting the alkali metal chlorite solution with the catalyst material to electrocatalytically produce an effluent containing chlorine dioxide.

33. The process according to claim 32, further comprising a cation exchange material.

34. The process according to claim 33, further comprising forming a lower layer consisting essentially of the cation exchange material, at least one intermediate layer consisting essentially of a mixture of the cation exchange material and the catalyst material, and an upper layer consisting essentially of the catalyst material, wherein flowing the aqueous alkali metal chlorite solution comprises flowing the solution from the lower layer to the upper layer.

35. The process according to claim 32, wherein the alkali metal chlorite solution comprises less than about 10,000 milligrams alkali metal chlorite per liter of solution.

36. The process according to claim 32, wherein the alkali metal chlorite solution comprises less than about 5,000 milligrams alkali metal chlorite per liter of solution.

37. The process according to claim 32, wherein the alkali metal chlorite solution comprises less than about 1,500 milligrams alkali metal chlorite per liter of solution.

38. A process for generating chlorine dioxide from an alkali metal chlorite solution, the process comprising:
applying a current to an electrolytic reactor including an anode compartment comprising an anode and a catalyst material; and a cathode compartment comprising a cathode;
flowing an aqueous alkali metal chlorite solution into the electrolytic reactor; and
contacting the alkali metal chlorite solution with the catalyst material to electrocatalytically produce an effluent containing chlorine dioxide.

39. The process according to claim 38, further comprising flowing water into the cathode compartment; generating hydroxyl ions; and passing alkali metal ions from the central compartment into the cathode compartment to produce an effluent of an alkali metal hydroxide.

40. The process according to claim 38, wherein the alkali metal chlorite solution is selected from the group consisting of sodium chlorite, potassium chlorite, lithium chlorite and combinations of at least one of the foregoing.

41. The process according to claim 38, wherein the central compartment further comprises a cation exchange material.

42. The process according to claim 41, wherein the cation exchange material is selected from the group consisting of strong acid polystyrene divinylbenzene crosslinked resins, weak acid polystyrene divinylbenzene crosslinked resins, iminoacetic acid polystyrene divinylbenzene crosslinked chelating selective cation exchange resins, synthetic inorganic cation exchangers, naturally occurring cationic exchangers and combination including at least one of the foregoing.

43. The process according to claim 41, wherein flowing the alkali metal chlorite solution into the central compartment comprises flowing the solution from the bottom layer to the upper layer.

44. The process according to claim 38, wherein the central compartment further comprises electrically conductive particles.

45. The process according to claim 38, wherein the central compartment comprises a bottom layer consisting essentially of the cation exchange material, an interlayer consisting essentially of a mixture of the cation exchange material and the catalyst material, and an upper layer consisting essentially of the catalyst material.

46. The process according to claim 38, wherein the alkali metal chlorite solution contacts the catalyst material for a time of about 0.1 to about 20 minutes.

47. The process according to claim 38, wherein flowing the alkali metal chlorite solution into the central compartment produces a pressure drop of about 0.1 to about 20 pounds per square inch.

48. The process according to claim 38, wherein the effluent containing the chlorine dioxide has a pH of about 1 to about 5.

49. The process according to claim 38, wherein the effluent containing the chlorine dioxide has a pH of about 2 to about 3.

50. The process according to claim 38, wherein the aqueous alkali metal chlorite solution comprises an alkali metal chlorite concentration less than about 1.5 gram per liter of solution.

51. The process according to claim 38, wherein the catalyst material comprises a shape selected from the group consisting of rods, extrudates, tablets, pills, irregular shaped particles, spheres, spheroids, capsules, discs, pellets and a combination of at least one of the foregoing.

52. A process for generating chlorine dioxide from an alkali metal chlorite solution, the process comprising:

applying a current to an electrolytic reactor, wherein the electrolytic reactor includes an anode compartment comprising an anode, a cathode compartment comprising a cathode, and a central compartment disposed between the anode and cathode compartments, wherein the central compartment comprises a catalyst material;

flowing water into the anode compartment and generating hydrogen atoms;

passing the hydrogen atoms into the central compartment;

flowing the alkali metal chlorite solution into the central compartment; and contacting the alkali metal chlorite solution with the catalyst material to produce an effluent containing chlorine dioxide.

53. The process according to claim 52, further comprising forming in the central compartment a lower layer consisting essentially of the cation exchange material, at least one intermediate layer consisting essentially of a mixture of the cation exchange material and the catalyst material, and an upper layer consisting essentially of the catalyst material, wherein flowing the aqueous alkali metal chlorite solution into the central compartment comprises flowing the solution from the lower layer to the upper layer.

54. The process according to claim 52, wherein the anode compartment and the cathode compartment comprise a cation exchange material.

55. An electrolytic reactor for the oxidation of chlorite ions in an aqueous solution, the reactor comprising:

an anode compartment comprising an anode;

a cathode compartment comprising a cathode; and a central compartment disposed between the anode and cathode compartments, wherein the central compartment comprises a catalyst material, and wherein a non-permselective membrane separates the anode compartment from the central compartment.

56. The electrolytic reactor according to claim 55, wherein the non-permselective membrane comprises a porous structure.

57. The electrolytic reactor according to claim 55, wherein the non-permselective membrane comprises a pore size greater than or equal to about 0.25 millimeters to less than or equal to about 2.8 millimeters.

58. The electrolytic reactor according to claim 55, wherein the non-permselective membrane comprises a pore size greater than or equal to about 0.3 millimeters to less than or equal to about 1.4 millimeters.

59. The electrolytic reactor according to claim 55, wherein the non-permselective membrane comprises a pore size greater than or equal to about 0.4 millimeters to less than or equal to about 0.6 millimeters.

60. The electrolytic reactor according to claim 55, wherein the non-permselective membrane comprises a polyolefin or a halogenated polymer.

61. The electrolytic reactor according to claim 60, wherein the fluorinated polymer comprises polytetrafluoroethylene, fluorinated ethylene propylene copolymers, perfluoropropylalkoxy copolymers, perfluormethylalkoxy copolymers, polychlorotrifluoroethylene copolymers, ethylene tetrafluoroethylene polymers, or polyvinylidene fluoride polymers.

62. The electrolytic reactor according to claim 55, wherein the non-permselective membrane comprises fluorinated poly(vinyl) polymers or chlorinated polymers.

63. The electrolytic reactor according to claim 55, wherein the central compartment further comprises a cation exchange material, wherein the cation exchange material and the catalyst material are arranged in layers, wherein each one of the layers has a different physical property.

64. The electrolytic reactor according to claim 63, wherein the cation exchange material forms a bottom layer, a mixture of the cation exchange material and the catalyst material forms an interlayer, and the catalyst material forms an upper layer.

65. The electrolytic reactor according to claim 55, wherein the catalyst material comprises a catalytic metal oxide and a support.

66. The electrolytic reactor according to claim 65, wherein the catalytic metal oxide is an oxide of a metal selected from the group consisting of ruthenium, platinum, palladium, osmium, iridium, rhodium, titanium, manganese, lead, zirconium, niobium, tantalum, tungsten, tin and combinations of at least one of the foregoing, and wherein the support is selected from the group consisting of metals, zeolites, anthracite, clinoptiliolite, aluminas, silicas, ceramics and carbon.

67. A process for generating chlorine dioxide from a dilute alkali metal chlorite solution, the process comprising:

applying a current to an electrolytic reactor, wherein the electrolytic reactor comprises an anode compartment comprising an anode, a cathode compartment comprising a cathode, and a central compartment disposed between the anode and cathode compartments, wherein the central compartment comprises a catalyst material and wherein a non-permselective membrane separates the anode compartment from the central compartment;

flowing water into the anode compartment and generating hydrogen atoms;

passing the hydrogen atoms into the central compartment;

flowing the dilute alkali metal chlorite solution into the central compartment; and contacting the dilute alkali metal chlorite solution with the catalyst material to produce an effluent containing chlorine dioxide.

68. The process according to claim 67, wherein the central compartment further comprises a cation exchange material, wherein the cation exchange material and the catalyst material are arranged in layers, wherein each one of the layers has a different physical property.

69. The process according to claim 67, wherein the dilute alkali metal chlorite solution comprises less than about 10,000 milligrams alkali metal chlorite per liter of solution.

70. The process according to claim 67, wherein the dilute alkali metal chlorite comprises less than about 5,000 milligrams alkali metal chlorite per liter of solution.

71. The process according to claim 67, wherein the dilute alkali metal chlorite solution comprises less than about 1,500 milligrams a metal chlorite per liter solution.

* * * * *